United States Patent
Won et al.

(10) Patent No.: US 10,622,705 B2
(45) Date of Patent: Apr. 14, 2020

(54) ANTENNA MODULE AND ELECTRONIC DEVICE INCLUDING THE SAME

(71) Applicant: WITS Co., Ltd., Yongin-si, Gyeonggi-do (KR)

(72) Inventors: Jae Sun Won, Suwon-si (KR); Young Min Cheon, Suwon-si (KR); Hee Seung Kim, Suwon-si (KR); Jae Hyuk Jang, Suwon-si (KR); Gie Hyoun Kweon, Suwon-si (KR); Chang Hee Lee, Suwon-si (KR); Soon Joung Yio, Suwon-si (KR); Hyo Jung Yoon, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 6 days.

(21) Appl. No.: 15/976,911

(22) Filed: May 11, 2018

(65) Prior Publication Data
US 2019/0013568 A1   Jan. 10, 2019

(30) Foreign Application Priority Data

Jul. 7, 2017   (KR) .................. 10-2017-0086595
Sep. 25, 2017   (KR) .................. 10-2017-0123377

(51) Int. Cl.
*H01Q 1/24* (2006.01)
*H01Q 1/22* (2006.01)
(Continued)

(52) U.S. Cl.
CPC .......... *H01Q 1/243* (2013.01); *H01Q 1/2208* (2013.01); *H01Q 7/00* (2013.01); *H02J 7/025* (2013.01); *H04B 5/0081* (2013.01); *H04M 1/026* (2013.01)

(58) Field of Classification Search
CPC ........ H01Q 1/2208; H01Q 1/243; H01Q 7/00; H01Q 7/06; H01Q 1/36; H01Q 1/38;
(Continued)

(56) References Cited

U.S. PATENT DOCUMENTS

| 8,976,075 B2 * | 3/2015 | Kato ................. H01Q 1/38 343/895 |
| 9,582,693 B2 * | 2/2017 | Yosui ................. H01Q 7/06 |

(Continued)

FOREIGN PATENT DOCUMENTS

| CN | 102916248 A | 2/2013 |
| CN | 103797642 A | 5/2014 |

(Continued)

OTHER PUBLICATIONS

Chinese Office Action dated Dec. 25, 2019 issued in corresponding Chinese Patent Application No. 201810709474.1.

*Primary Examiner* — Tho G Phan
(74) *Attorney, Agent, or Firm* — Harness, Dickey & Pierce, P.L.C.

(57) ABSTRACT

An antenna module disposed inside a conductive cover and performing near field communications includes: a wiring portion having antenna wirings formed on an insulating substrate and having a first surface facing an inner surface of the conductive cover and a second surface opposing the first surface; a first magnetic portion disposed between the first surface of the wiring portion and the conductive cover; and a second magnetic portion disposed on the second surface of the wiring portion, wherein the first magnetic portion and the second magnetic portion are disposed to partially overlap each other or to have edges thereof in vertical correspondence with each other.

17 Claims, 15 Drawing Sheets

(51) Int. Cl.
*H04M 1/02* (2006.01)
*H02J 7/02* (2016.01)
*H01Q 7/00* (2006.01)
*H04B 5/00* (2006.01)

(58) Field of Classification Search
CPC .... H02J 7/025; H04M 1/026; G10K 11/1781; G10K 11/17817; G10K 11/17857; G10K 2210/1082; G10K 2210/3027; G10K 2210/3055; H04R 1/1083
See application file for complete search history.

(56) References Cited

U.S. PATENT DOCUMENTS

| | | | |
|---|---|---|---|
| 9,917,350 B2* | 3/2018 | Noh | H01Q 1/243 |
| 2009/0033567 A1* | 2/2009 | Takeuchi | G06K 19/07749 |
| | | | 343/702 |
| 2012/0262357 A1 | 10/2012 | Kato et al. | |
| 2015/0249282 A1 | 9/2015 | Orihara et al. | |
| 2016/0380332 A1 | 12/2016 | Kim et al. | |

FOREIGN PATENT DOCUMENTS

| | | |
|---|---|---|
| CN | 104584323 A | 4/2015 |
| CN | 104966891 A | 10/2015 |
| CN | 105576341 A | 5/2016 |
| CN | 205264860 U | 5/2016 |
| CN | 206180119 U | 5/2017 |
| JP | 4687832 B2 | 5/2011 |
| KR | 10-2015-0046134 A | 4/2015 |
| KR | 10-2017-0000352 A | 1/2017 |
| WO | WO-2014/148314 A1 | 9/2014 |
| WO | WO-2016/190055 A1 | 12/2016 |

* cited by examiner

ANTENNA MODULE AND ELECTRONIC DEVICE INCLUDING THE SAME

CROSS-REFERENCE TO RELATED APPLICATION(S)

This application claims the benefit under 35 USC § 119(a) to Korean Patent Application Nos. 10-2017-0086595 filed on Jul. 7, 2017 and 10-2017-0123377 filed on Sep. 25, 2017 in the Korean Intellectual Property Office, the entire disclosures of each of which are incorporated herein by reference for all purposes.

BACKGROUND

1. Field

The disclosure relates to an antenna module and an electronic device including the same.

2. Description of Related Art

As portable terminals such as smartphones are increasingly universally used, and functions of such portable terminals are improved, a payment method for portable terminals using near field communications has emerged. However, a data transmission channel between point-of-sale (POS) terminals universally installed in stores, or the like, and smartphones, does not exist, resulting in payments using smartphones having many obstacles to implementation. In order to solve such problems, payment methods using a two-dimensional (2D) barcode or near field communications (NFC) have been suggested.

However, since a reading apparatus appropriate for a POS terminal does not exist, it is difficult to universally use payment methods using a 2D barcode or NFC, and particularly, in a case of NFC, standardized NFC performance is insufficient in many smartphones, and a separate apparatus for reading NFC signals needs to be provided.

Therefore, methods capable of performing a payment using smartphones while using the POS terminals generally used in the stores, or the like, as they are, have been suggested. Particularly, recently, a magnetic secure transmission (MST) method capable of performing payments without adding a separate reading apparatus to the POS terminal has been suggested.

In addition, recently, both an NFC antenna and an MST antenna have been mounted on one portable terminal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an antenna module includes a wiring portion including antenna wirings on an insulating substrate and including a first surface facing an inner surface of a conductive cover and a second surface opposing the first surface, a first magnetic portion disposed between the first surface of the wiring portion and the conductive cover, and a second magnetic portion disposed on the second surface of the wiring portion, wherein the first magnetic portion and the second magnetic portion are disposed to partially overlap each other or to have edges thereof in vertical correspondence with each other.

The antenna module may include a wiring portion including a spiral portion including a general contour in a linear shape including a length longer than a width and including a wiring comprising a spiral shape and a lead portion extending from one end of the spiral portion and including a contact pad.

The antenna module may include a first magnetic portion disposed to face a portion of the wiring comprising the spiral shape.

The antenna module may include the first magnetic portion and the second magnetic portion penetrating through the wiring portion and connected to each other.

The antenna module may include the antenna wirings being disposed on both surfaces of the insulating substrate, and the first magnetic portion and the second magnetic portion being disposed in regions in which the antenna wirings are not disposed.

In another general aspect, an electronic device includes a conductive cover including a space having a slit shape, and a first antenna module disposed inside the conductive cover and performing near field communications, wherein the first antenna module includes a wiring portion having antenna wirings on an insulating substrate and comprising a first surface facing an inner surface of the conductive cover and a second surface opposing the first surface, a first magnetic portion disposed between the first surface of the wiring portion and the conductive cover, and a second magnetic portion disposed on the second surface of the wiring portion, the first magnetic portion and the second magnetic portion being disposed to partially overlap each other or to have edges thereof in vertical correspondence with each other.

The electronic device may include the first magnetic portion disposed so that at least a portion of the first magnetic portion faces the space.

The electronic device may include an edge portion of the first magnetic portion disposed along a boundary of the space.

The electronic device may include any one of the first magnetic portion and the wiring portion disposed to protrude toward the space.

The electronic device may include the first magnetic portion disposed to protrude toward the space to a greater extent than the wiring portion.

The electronic device may include the conductive cover having a camera hole, and at least a portion of the wiring portion disposed between the space and the camera hole.

The electronic device may include a second antenna module disposed spaced apart from the first antenna module.

The electronic device may include the second antenna module including a wiring portion and a magnetic portion disposed stacked, and the magnetic portion of the second antenna module including a body portion disposed to face the wiring portion of the second antenna module, and an extension portion having one end connected to the body portion or disposed adjacent to the body portion and the other end disposed toward the space.

The electronic device may include the extension portion disposed so that a distal end portion of the extension portion overlaps the first antenna module or the space.

The electronic device may include the extension portion disposed so that an end of the extension portion is adjacent to the camera hole.

The electronic device may include the wiring portion of the first antenna module comprising a spiral portion disposed between the space and the camera hole and a lead portion extending from one end of the spiral portion toward the second camera module, and the extension portion of the second camera module disposed substantially parallel with the lead portion at a position adjacent to the lead portion.

The electronic device may include the first antenna module forming a magnetic field in a form of a solenoid.

The electronic device may include the first antenna module being a near field communications (NFC) antenna, and the second antenna module being a magnetic secure transmission (MST) antenna or a coil for wireless power charging.

The electronic device may be a smartphone.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
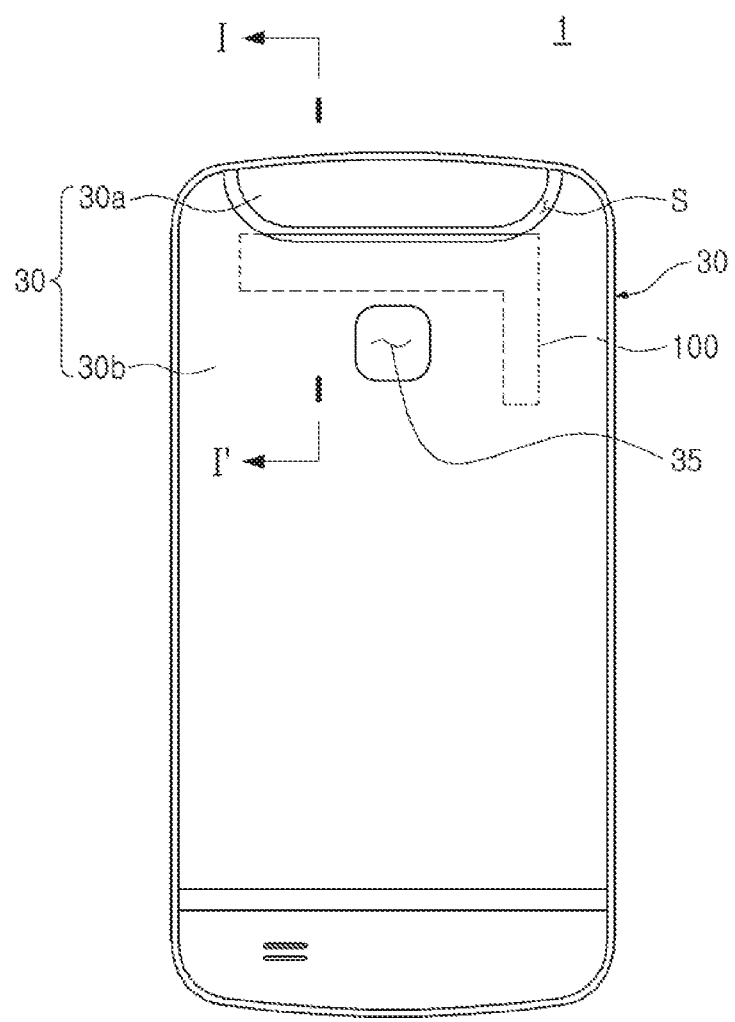
FIG. 1 is a rear view of a portable terminal including an antenna module according to an embodiment of the disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In an embodiment, a portable terminal will be described as an example of an electronic device. However, the electronic device according to the disclosure is not limited to the portable terminal. For example, the electronic device may include all devices that are portable and may perform wireless communications, such as a laptop computer, a tablet personal computer (PC), a wearable device, a drone, and the like.

Figure 2:
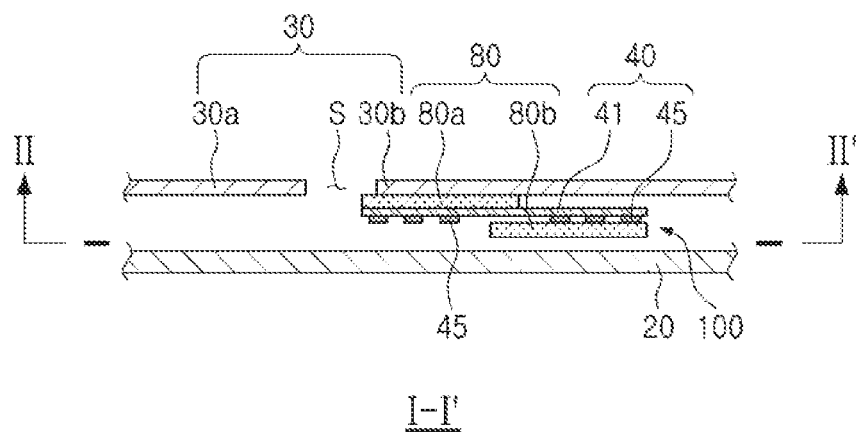
FIG. 2 is a cross-sectional view taken along line I-I' of FIG. 1.
Figure 3:
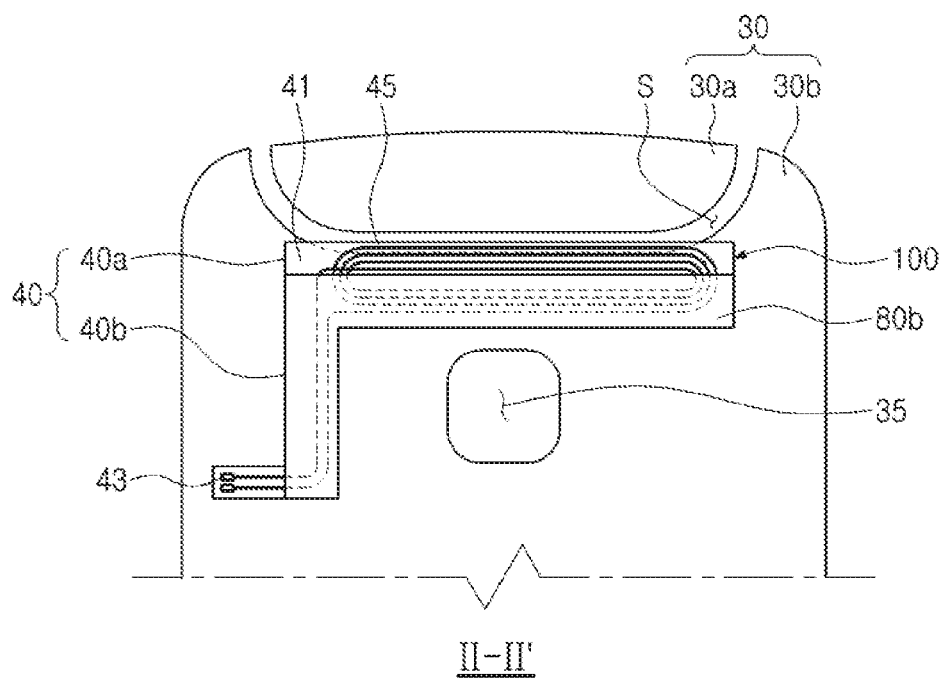
FIG. 3 is a plan view taken along line II-II' of FIG. 2.
Figure 4:
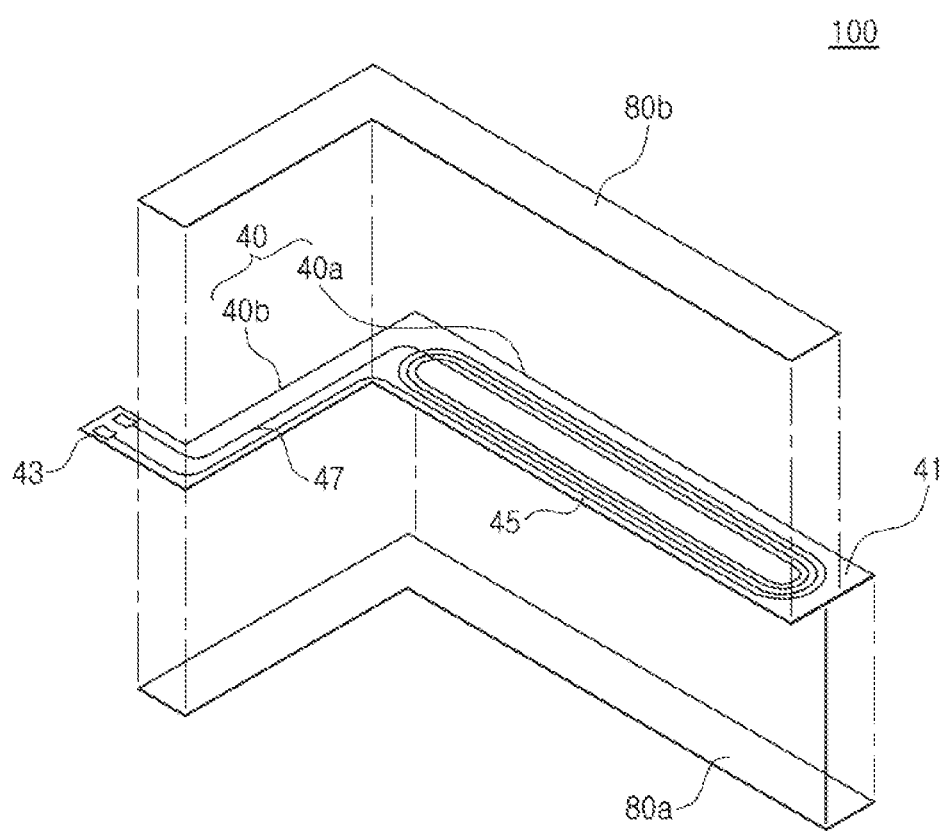
FIG. 4 is an exploded perspective view of an antenna module illustrated in FIG. 3.

FIG. 1 is a rear view of a portable terminal including an antenna module according to an embodiment, and FIG. 2 is a cross-sectional view taken along line I-I' of FIG. 1. In addition, FIG. 3 is a plan view taken along line II-II' of FIG. 2, and FIG. 4 is an exploded perspective view of an antenna module illustrated in FIG. 3.

Referring to FIGS. 1 through 4, a portable terminal 1 according to an embodiment may include a terminal body 20 and a cover 30 formed of a conductive material. In addition, the portable terminal 1 may include an antenna module 100 disposed between the terminal body 20 and the cover 30 in order to perform wireless communications with external devices.

The cover 30 may be coupled to one surface (for example, a rear surface) of the terminal body 20, and may be, for example, a battery cover separated from the terminal body 20 at the time of replacing a battery. However, the cover 30 is not limited thereto, but may also be an integrated cover that it is difficult to separate from the terminal body 20.

The cover 30 according to an embodiment may include at least two plates 30a and 30b formed of a metal (for example, aluminum, or the like) and coupled to each other to complete a flat plate form.

When the entirety of the cover 30 is formed of metal, radio waves radiated from the antenna module 100 may be shielded by the cover 30, such that wireless communications may not be appropriately performed.

To this end, the cover 30 according to an embodiment may include a plurality of plates 30a and 30b disposed to be spaced apart from each other. In an embodiment, a case in which the cover 30 includes a first plate 30a and a second plate 30b is described by way of example. However, the cover is not limited thereto, but may be variously modified, in embodiments, as necessary. For example, the cover 30 may also include three or more plates.

The plates 30a and 30b may be formed of a metal, and a space S may be formed between the plates 30a and 30b. The space S may have a slit shape cutting the cover 30. The space S may be an empty space, and may be filled with a non-conductive material such as a resin or polymer, in embodiments, as necessary.

Meanwhile, referring to FIGS. 1 and 3, a case in which the plates 30a and 30b are not electrically connected to each other is illustrated in an embodiment. However, the cover 30 is not limited thereto. That is, a connection portion (not illustrated) connecting the plates 30a and 30b to each other may be added to the cover 30 in order to easily manufacture the cover 30. The connection portion may be disposed in the space S, and may have both ends connected, respectively, to different plates 30a and 30b.

The antenna module 100 may be disposed in the portable terminal 1, and may include a wiring portion 40 and a magnetic portion 80.

The wiring portion 40 may include an insulating substrate 41 and antenna wirings 45 formed on the insulating substrate 41.

The insulating substrate 41, which is a thin film substrate having circuit wirings formed on one surface or opposite surfaces thereof, may be, for example, an insulating film (for example, a polyimide film). However, the insulating substrate 41 is not limited thereto. That is, various kinds of substrates (for example, a printed circuit board (PCB), a ceramic substrate, a glass substrate, an epoxy substrate, a flexible PCB, and the like) well-known in the related art may be selectively used as the insulating substrate 41 as long as circuit wirings may be formed on opposite surfaces thereof.

The antenna wirings 45 may be formed on one surface or opposite surfaces of the insulating substrate 41, and may be configured in a form of circuit wirings formed of a copper foil, or the like.

The antenna wirings 45 according to an embodiment may be manufactured by patterning a double-sided copper clad laminate (CCL). Alternatively, the antenna wrings 45 may be formed on opposite surfaces of a flexible insulating substrate such as a film by a photolithography method.

Therefore, the wiring portion 40 may be configured in a form of a flexible PCB having a double-sided structure.

The wiring portion 40 according to an embodiment may be formed very thin. However, the wiring portion 40 may be manufactured in a form of a multilayer substrate or be manufactured in a form of a PCB having rigidity, in embodiments, as necessary.

The antenna wiring 45 is not necessarily embedded in the insulating substrate 41, but may protrude from the insulating substrate 41. However, the antenna wiring 45 is not limited thereto. In addition, the antenna wiring 45 may be formed of a single wire coil or be formed of a coil having a form of a Litz wire including several strands.

The antenna wiring 45 according to an embodiment may be formed in a spiral shape on one surface of the insulating substrate 41, and may have contact pads 43 formed at both ends thereof in order to electrically connect the antenna wiring 45 to the terminal body 20.

Therefore, the wiring portion 40 according to an embodiment may be divided into a spiral portion 40a in which the antenna wiring 45 having the spiral shape described above is disposed and a lead portion 40b in which the contact pads 43 and connection wirings 47 connecting the spiral portion 40a and the contact pads 43 to each other are formed.

The spiral portion 40a may generally have a linear shape having a small width and a large length, and may be disposed in parallel with the space S in a length direction of the space S. The antenna wiring 45 formed in the spiral portion 40a may include four turns or more of spiral pattern. However, the wiring portion according to the present disclosure is not limited thereto, but may be variously modified, as necessary.

The lead portion 40b may include the contact pads 43 and the connection wirings 47.

The connection wirings 47 may connect both ends of a spiral pattern formed in the spiral portion 40a and the contact pads 43 to each other. In addition, the contact pads 43 may serve as connection terminals electrically externally connecting the wiring portion 40.

The lead portion 40b may extend from one end of the spiral portion 40a in a direction approximately perpendicular to the spiral portion 40a.

Therefore, the wiring portion 40 according to an embodiment may generally have an '¬' (L) shape. However, the shape of the wiring portion 40 may be changed depending on a length or an extending direction of the lead portion 40b.

Meanwhile, although not illustrated, an insulating protecting layer (not illustrated) for protecting the antenna wiring 45 from external impact may be formed on the antenna wiring 45, in embodiments, as necessary.

Referring to FIG. 2, the wiring portion 40 may have a first surface facing an inner surface of the cover 30 and a second surface opposing the first surface of the cover. The magnetic portion 80 may be disposed on each of the first and second surfaces of the wiring portion 40.

The magnetic portion 80 may be used as a magnetic path of a magnetic field generated by the antenna wiring 45 of the wiring portion 40, and may be provided in order to efficiently form the magnetic path of the magnetic field. To this end, the magnetic portion 80 may be formed of a material in which the magnetic path may be easily formed, for example, a material having a magnetic permeability, such as ferrite, nanocrystal, an amorphous material, a silicon steel sheet, or the like.

The magnetic portion 80 may have a flat shape such a sheet, and may be disposed on each of opposite surfaces of the wiring portion 40.

In more detail, the magnetic portion 80 may include a first magnetic portion 80a disposed on the first surface of the wiring portion 40 and a second magnetic portion 80b disposed on the second surface of the wiring portion 40. Therefore, the wiring portion 40 may be disposed to be interposed between the first magnetic portion 80a and the second magnetic portion 80b.

Figure 10:
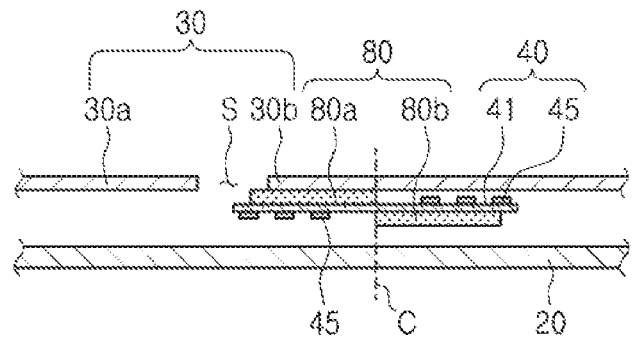

As illustrated in FIG. 2, the first magnetic portion 80a and the second magnetic portion 80b may be disposed to partially face each other in a central region of the spiral pattern of the spiral portion 40a. Here, the term "face" means that an overlapping portion between the first magnetic portion 80a and the second magnetic portion 80b exists when the second magnetic portion 80b is projected onto the first magnetic portion 80a. However, the first and second magnetic portions 80a and 80b are not limited thereto. That is, as illustrated in FIG. 10, the first magnetic portion 80a and the second magnetic portion 80b may have edges thereof in vertical correspondence with each other along a boundary C therebetween when the position of the second magnetic portion 80b overlaps the plane on which the first magnetic portion 80a is disposed in a vertical direction.

Since the first magnetic portion 80a is coupled to the first surface of the wiring portion 40, the first magnetic portion 80a may be disposed between the wiring portion 40 and the cover 30.

The first magnetic portion 80a may be disposed to cover a portion of the antenna wiring 45 of the spiral portion 40a and the lead portion 40b. In this case, the first magnetic portion 80a may be coupled to the wiring portion 40 to face an approximately half of the antenna wiring 45 of the spiral portion 40a. However, the first magnetic portion 80a according to the present disclosure is not limited thereto.

The second magnetic portion 80b may be coupled to the second surface of the wiring portion 40, and may be coupled to the wiring portion 40 to cover the remaining half of the antenna wiring 45 of the spiral portion 40a and the lead portion 40b. Therefore, the first magnetic portion 80a and the second magnetic portion 80b may have different shapes.

Meanwhile, the cover 30 according to an embodiment may have a camera hole 35. The camera hole 35 may be formed at a position close to the space S, and may be disposed to be spaced apart from the space S by a predetermined distance.

In addition, at least a portion of the antenna module 100 according to an embodiment may be disposed between the camera hole 35 and the space S. In an embodiment, the spiral portion 40a may be disposed between the camera hole 35 and the space S. Therefore, the spiral portion 40a may have a long bar shape to be disposed between the camera hole 35 and the space S, and the antenna wiring 45 formed in the spiral portion 40a may have a spiral shape having a small width and a large length.

Therefore, the antenna wiring 45 formed in the spiral portion 40a may be disposed to be elongated in the length direction of the space S, and may be disposed approximately in parallel with the space S.

Alternatively, the antenna module 100 according to an embodiment may be coupled to the inner surface of the cover 30 or be disposed adjacent to the inner surface of the cover 30, and may be disposed so that at least a portion thereof faces the space S. Therefore, when the space S is empty space, at least a portion of the antenna module 100 may be externally exposed through the space S to be identified, as illustrated in FIGS. 1 and 2. In this case, the first magnetic portion 80a of the antenna module 100 may be externally exposed through the space S.

In addition, in the antenna module 100 according to an embodiment, the first magnetic portion 80a of the antenna module 100 may be disposed between the wiring portion 40 and the cover 30, and at least a portion of the antenna module 100 may be disposed between the space S and the wiring portion 40.

Therefore, when the cover 30 is viewed from an outer surface, only the first magnetic portion 80a of the antenna module 100 may be seen or identified with the naked eyes, and the wiring portion 40 may be covered with the first magnetic portion 80a, and it may thus be difficult to see or identify the wiring portion 40 with the naked eyes.

The antenna module according to an embodiment configured as described above may be used a near field communications (NFC) antenna. However, the antenna module according to an embodiment is not limited thereto.

In addition, in the antenna module according to an embodiment, the antenna wiring 45 may have a spiral shape, but a magnetic field generated from the antenna wiring 45 is formed in a surface direction of the antenna module 100 along the first and second magnetic portions 80a and 80b, and the antenna module may thus be operated in a form such as a solenoid antenna.

Therefore, the magnetic field may be radiated outwardly of the cover 30 through the spacing space S facing the first magnetic portion 80a.

Meanwhile, the present disclosure is not limited to the abovementioned embodiments, but may be variously modified.

Figure 5:
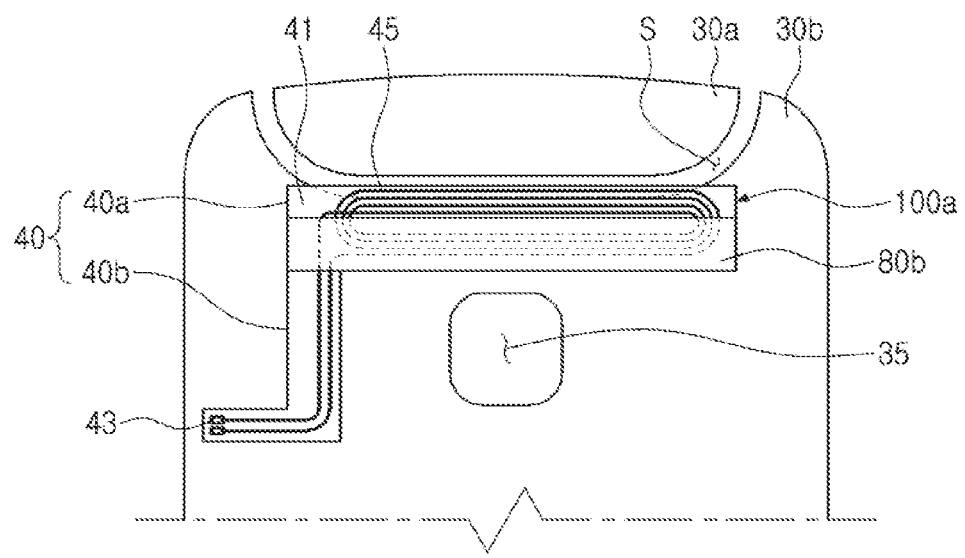
FIG. 5 is a schematic view illustrating an antenna module according to an embodiment.

FIG. 5 is a schematic view illustrating an antenna module according to another embodiment, and illustrates a plane corresponding to FIG. 3.

Referring to FIG. 5, in an antenna module 100a according to an embodiment, the second magnetic portion 80b may be disposed in only the spiral portion 40a, and may not be disposed in the lead portion 40b. As described above, in the antenna module 100a according to the disclosure, a shape of the magnetic portion 80 or the wiring portion 40 may be modified depending on an internal structure of the portable terminal.

Meanwhile, in an embodiment, the first magnetic portion 80a may also be disposed in a region corresponding to the lead portion 40b. However, in embodiments, as necessary, the first magnetic portion 80a may not be disposed in the region corresponding to the lead portion 40b, similar to the second magnetic portion 80b.

As described above, in the antenna module 100a according to an embodiment, the magnetic portion 80 may be disposed on each of opposite surfaces of the spiral portion 40a, but may be selectively disposed in the lead portion 40b.

FIGS. 6 through 13 are schematic views illustrating antenna modules according to other embodiments, and illustrate cross sections corresponding to FIG. 2.

Figure 6:
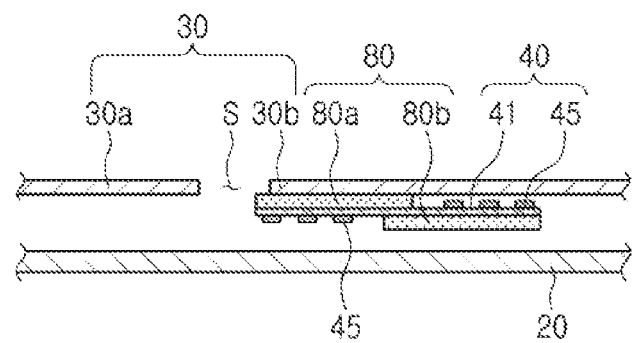
FIGS. 6 through 13 are schematic views illustrating antenna modules according to embodiments.

First, referring to FIG. 6, in an antenna module according to an embodiment, the antenna wirings 45 formed in the spiral portion 40a (see FIG. 4) may be distributed and disposed on opposite surfaces of the insulating substrate 41. In addition, the first magnetic portion 80a and the second magnetic portion 80b may be disposed in regions in which the antenna wirings 45 do not exist, respectively. Therefore, the first magnetic portion 80a and the second magnetic portion 80b may be in surface-contact with the insulating substrate 41 and be disposed to be closely adhered to the insulating substrate 41, and an entire thickness of the antenna module may thus be significantly decreased.

Figure 7:
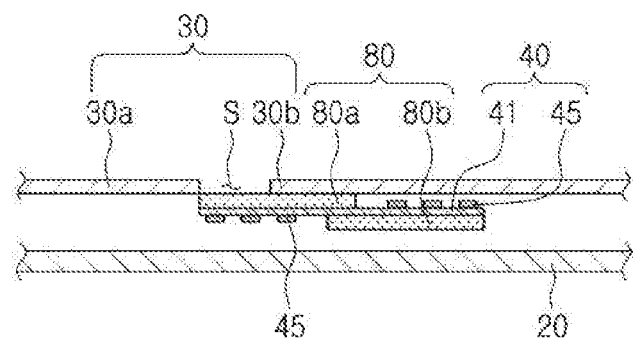

Referring to FIG. 7, an antenna module according to an embodiment may be disposed to overlap the space S as much as possible. In this case, the antenna module may be disposed so that a portion of the antenna module in which the antenna wiring 45 is disposed overlaps the space S.

Figure 8:
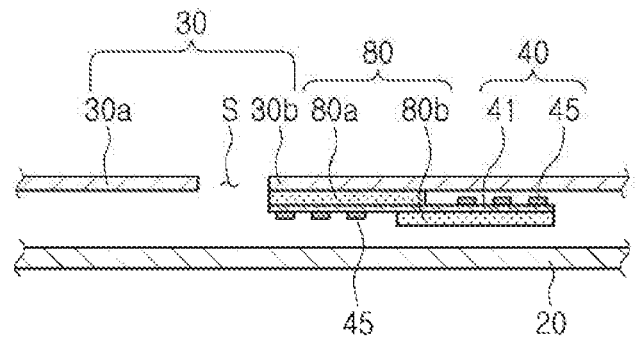

Referring to FIG. 8, an antenna module according to an embodiment may be disposed along a boundary of the space S so as not to be externally exposed through the space S. Therefore, an edge portion of the first magnetic portion 80a may also be disposed along the boundary of the spacing space S.

Meanwhile, in an embodiment, the entirety of the antenna module may be disposed on an inner surface of the second plate 30b. However, the antenna module is not limited thereto, but may also be disposed on an inner surface of the first plate 30a, in embodiments, as necessary.

Figure 9:
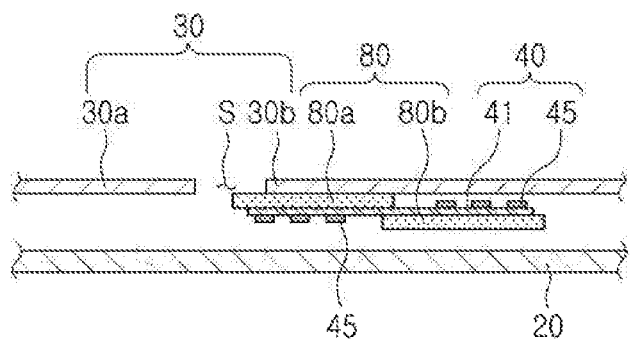

Alternatively, referring to FIG. 9, an antenna module according to an embodiment may be disposed to overlap the space S, and the first magnetic portion 80a may further protrude toward the space S as compared to the wiring portion 40. In addition, various modifications may be made. For example, as illustrated in FIG. 10, the wiring portion 40 may further protrude as compared to the first magnetic portion 80a.

Meanwhile, referring to FIG. 10, in the central region of the spiral pattern of the spiral portion 40a, the first magnetic portion 80a and the second magnetic portion 80b do not face or overlap each other, but may be disposed along the boundary C therebetween. Therefore, when the magnetic field of the second magnetic portion 80b is projected onto the magnetic field of the first magnetic portion 80a, the magnetic fields of the first magnetic portion 80a and the second magnetic portion 80b may be disposed to be engaged with each other along the boundary C. Such a configuration may be easily applied to other embodiments.

Figure 11:
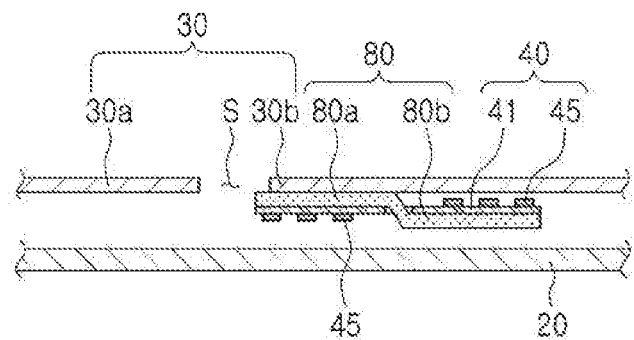

Referring to FIG. 11, in an antenna module according to an embodiment, a through-hole may be formed in the center of the antenna wiring 45 in the central region of the spiral pattern of the spiral portion 40a. In addition, the first magnetic portion 80a and the second magnetic portion 80b may be connected to each other through the through-hole.

Therefore, in an embodiment, the first magnetic portion 80a and the second magnetic portion 80b may be integrally formed as one body.

Meanwhile, FIG. 11 illustrates a cross section of a portion in which the first magnetic portion 80a and the second magnetic portion 80b are connected to each other through the through-hole. Therefore, portions of the first magnetic portion 80a and the second magnetic portion 80b disposed outside the through-hole may be disposed to partially face each other as in the abovementioned embodiments or be disposed to be engaged with each other as illustrated in FIG. 10.

Figure 12:
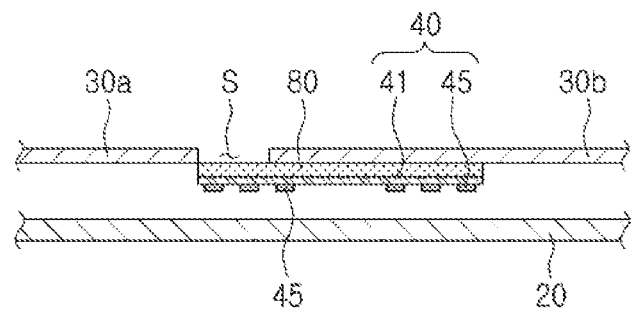

Referring to FIG. 12, in an antenna module according to an embodiment, the magnetic portion 80 may be disposed only between the wiring portion 40 and the cover 30. In this case, the magnetic portion 80 may be disposed to face the entirety of the spiral portion 40a of the wiring portion 40.

Meanwhile, a case in which the antenna module is disposed to overlap the space S as much as possible is illustrated by way of example in FIG. 12, but the antenna module is not limited thereto.

Figure 13:
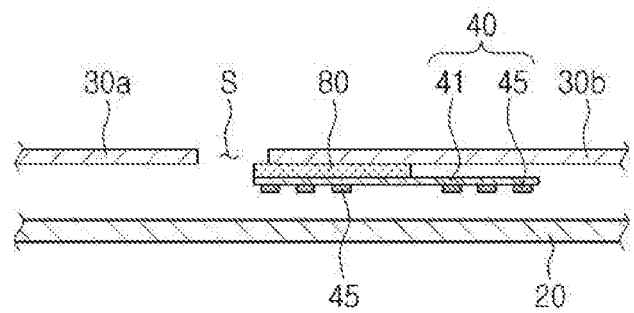

Referring to FIG. 13, in an antenna module according to an embodiment, the magnetic portion 80 may be disposed only between the wiring portion 40 and the cover 30, and may be disposed to face a portion of the spiral portion 40a of the wiring portion 40 rather than the entirety of the spiral portion 40a of the wiring portion 40. For example, the magnetic portion 80 according to an embodiment may have the same as that of the first magnetic portion 80a described above with reference to FIG. 2.

FIGS. 14 through 20 are schematic views illustrating antenna modules according to other embodiments, and illustrate planes corresponding to FIG. 3.

Each of the antenna modules illustrated in FIGS. 14 through 20 may include a first antenna module 100 and a second antenna module 110.

The first antenna module 100 may be the antenna module 100 (see FIG. 3) according to the abovementioned embodiment, and the second antenna module 110 may be an antenna module used for near field communications different from that of the first antenna module 100. For example, the first antenna module 100 may be used as a near field communications (NFC) antenna, and the second antenna module 110 may be used as a magnetic secure transmission (MST) antenna or a coil for wireless power charging. However, the first antenna module and the second antenna module according to the present embodiment are not limited thereto.

The second antenna module 110 may be disposed to be spaced apart from the first antenna module 100 by a predetermined distance. In this case, the second antenna module 110 may be disposed at a position adjacent to the lead portion 40b (see FIG. 3) of the first antenna module 100. Therefore, the lead portion 40b of the first antenna module 100 may be disposed to extend from one end of the spiral portion 40a (see FIG. 3) toward the second antenna module 110.

The camera hole 35 may be disposed between the second antenna module 110 and the first antenna module 100.

The second antenna module 110 may include a magnetic portion 180 and a wiring portion 140, similar to the first antenna module 100. The wiring portion 140 may be configured in a form in which a wiring (see FIG. 14) having a spiral shape or a wiring (see FIG. 15) having a solenoid shape is formed on an insulating substrate. In addition, although not illustrated, the wiring portion 140 may also be configured in a form in which a magnetic portion penetrates through and is inserted into the center of the wiring having the spiral shape.

The wiring portion 140 may be connected to the contact pads 43 of the first antenna module 100. Therefore, the second antenna module 110 may be connected to the first antenna module 100 in portions in which the contact pads 43 are formed. In this case, the first antenna module 100 and the second antenna module 110 may be formed integrally with each other.

However, the first antenna module 100 and the second antenna module 110 are not limited thereto, but may be variously modified. For example, the first antenna module 100 and the second antenna module 110 may be separately manufactured and be then bonded to each other through the contact pads 43.

Figure 14:
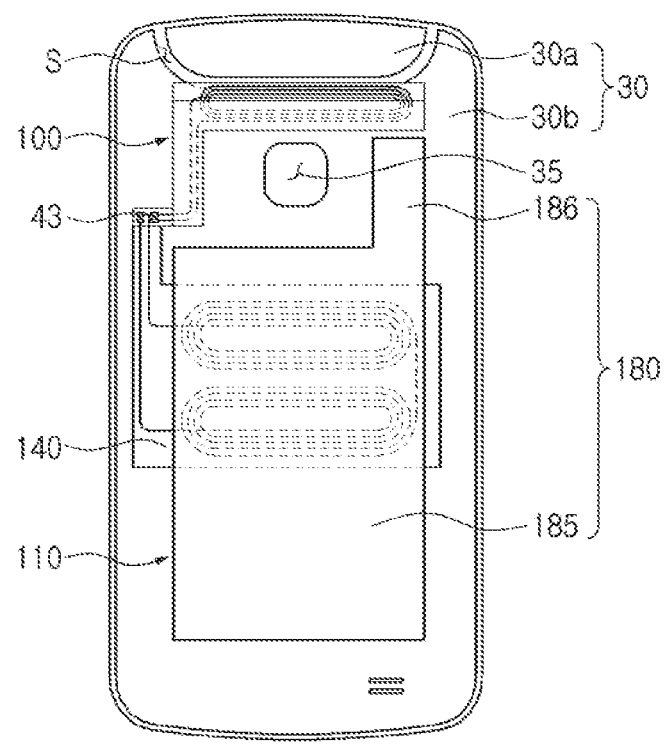
FIGS. 14 through 20 are schematic views illustrating antenna modules according to other embodiments.

The magnetic portion 180 may be disposed in various forms depending on a wiring structure of the wiring portion 140. For example, when the wiring portion 140 includes the wiring having a spiral shape as illustrated in FIG. 14, the wiring portion 140 may be disposed between the magnetic portion 180 and the cover 30.

However, the configuration of the second antenna module is not limited thereto. In an embodiment, as necessary, a portion of the magnetic portion 180 may also penetrate through a central region of an antenna wiring formed in the wiring portion 140 and be disposed between the wiring portion 140 and the cover 30.

Figure 15:
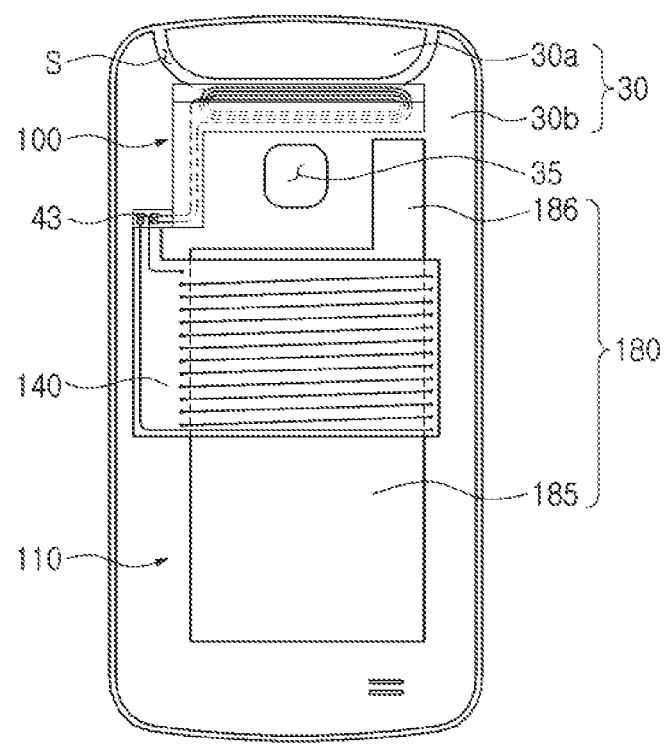

Alternatively, when the wiring portion 140 is configured in a solenoid form as illustrated in FIG. 15, at least a portion of the magnetic portion 80 may be inserted into the wiring portion 140. In this case, the wiring portion 140 may include two insulating substrates, and the magnetic portion 180 may be inserted between the two insulating substrates.

Meanwhile, when the first antenna module 100 is used as an NFC antenna and the second antenna module 110 is used as an MST antenna, the magnetic portion 80 (see FIG. 2) of the first antenna module 100 and the magnetic portion 180 of the second antenna module 110 may be formed of materials having different magnetic permeabilities.

MST may be performed at a frequency lower than that of NFC. Therefore, the magnetic portion 180 of the second antenna module 110 used for MST may be formed of a material having a high magnetic permeability and a high saturation magnetic flux density in a low frequency band (for example, 2 kHz).

In addition, since the magnetic portion 80 of the first antenna module 100 is used for NFC, the magnetic portion 80 of the first antenna module 100 may be formed of a material having a high magnetic permeability, a high saturation magnetic flux density, a low loss rate in a relatively high frequency band (for example, 100 kH and 13.56 MHz) as compared to the magnetic portion 180 of the second antenna module 110.

Therefore, in an embodiment, the magnetic portion 180 of the second antenna module 110 may be formed of a material having a magnetic permeability higher than that of the magnetic portion 80 of the first antenna module 100.

To this end, the magnetic portion 80 of the first antenna module 100 and the magnetic portion 180 of the second antenna module 110 may be formed of different materials. However, the magnetic portion 80 and the magnetic portion 180 are not limited thereto. That is, magnetic permeability of the magnetic portion 80 and the magnetic portion 180 may be adjusted by forming the magnetic portion 80 and the magnetic portion 180 using the same material and then making fragments of the magnetic portion 80 and the magnetic portion 180 different from each other.

For example, when nanocrystals are used as a material of each of the magnetic portion 80 and the magnetic portions 180, the nanocrystals may be fractured into and used as several pieces. In this case, the magnetic portion 180 of the second antenna module 110 is not fractured or is fractured as little as possible, such that a magnetic permeability of the magnetic portion 180 may be increased, while the magnetic portion 80 of the first antenna module 100 is further fractured as compared to the magnetic portion 180 of the second antenna module 110, such that a magnetic permeability and a loss rate of the magnetic portion 180 may be adjusted.

In addition, in an embodiment, the magnetic portion 180 of the second antenna module 110 may include a body portion 185 to which the wiring portion 140 is coupled and an extension portion 186.

The extension portion 186 may have a thin and long bar shape, and have one end connected to the body portion 185 and the other end (or a distal end) disposed at a position adjacent to the space S or disposed to overlap the space S. Therefore, the extension portion 186 may have a form in which it linearly extends from the body portion 185 toward the space S to be elongated.

Therefore, a magnetic field generated from the second antenna module 110 may be radiated to the space S through the extension portion 186.

The extension portion 186 and the body portion 185 may be formed of the same material, and may be integrally formed as one body. However, the extension portion 186 and the body portion 185 are not so limited, but may be configured to be separated from each other and may be formed of different materials, in embodiments, as necessary.

In all of the antenna modules illustrated in FIGS. 14 through 17, the extension portion 186 may be disposed on an opposite side of the lead portion 40b of the first antenna module 100 in relation to the camera hole 35. Therefore, the extension portion 186 and the first antenna module 100 may be disposed to surround the camera hole 35 formed in the cover 30.

A distal end of the extension portion 186 may be variously modified.

Figure 16:
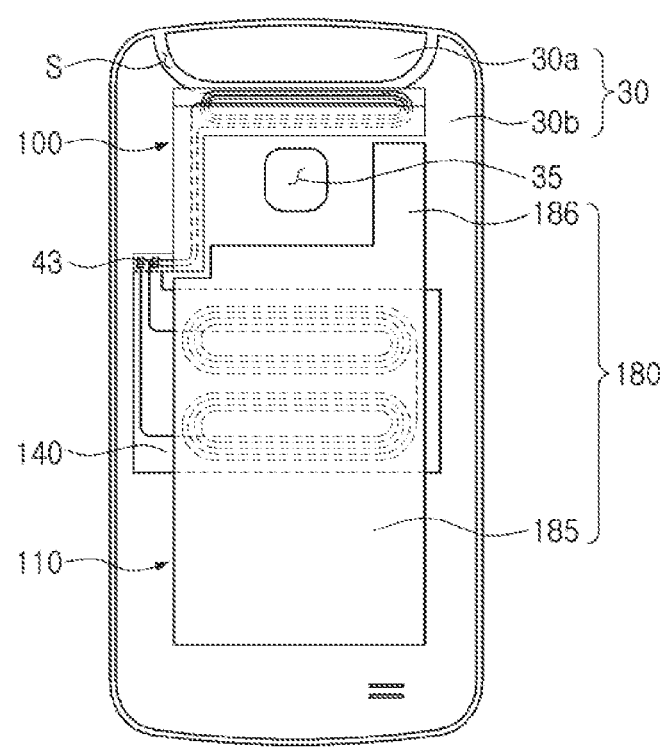

In each of the second antenna modules 110 illustrated in FIGS. 14 through 16, the distal end of the extension portion 186 may be disposed at a position adjacent to a distal end of the spiral portion 40a of the first antenna module 100. In addition, the body portion 185 of the second antenna module 110 may be disposed at a position adjacent to a distal end of the lead portion 40b of the first antenna module 100.

In this case, a magnetic field generated from the second antenna module 110 may extend along the extension portion 186 and the first magnetic portion 80a of the first antenna module 100, and may be externally radiated through the space S.

In the antenna module illustrated in FIG. 16, the lead portion 40b of the first antenna module 100 may extend toward the body portion 185 of the second antenna module 110, and the body portion 185 of the second antenna module 110 may thus provide an accommodating space in which a distal end of the lead portion 40b of the first antenna module 100 may be disposed.

Figure 17:
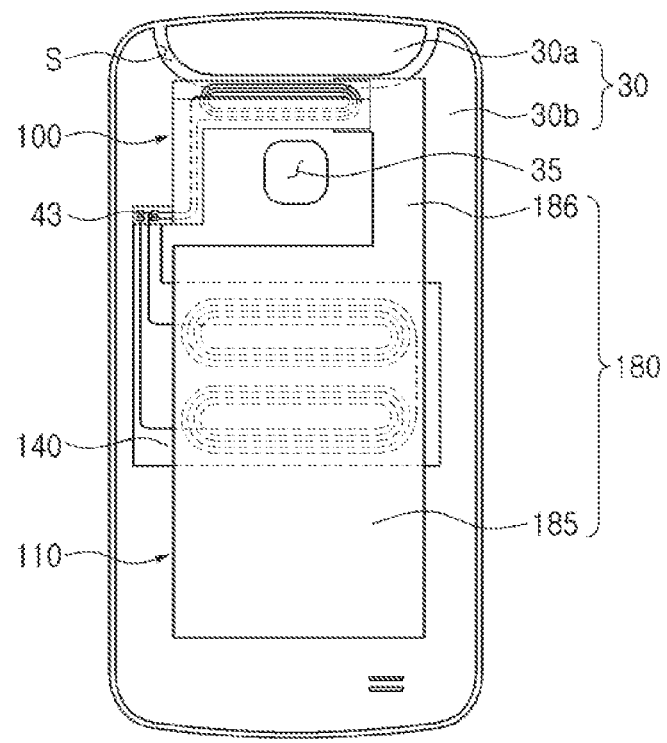

In the second antenna module 110 illustrated in FIG. 17, the distal end of the extension portion 186 may be disposed to overlap the space S. In this case, a magnetic field generated from the second antenna module 110 may be directly radiated from the extension portion 186 to the space S.

Alternatively, in the second antenna module 110, the distal end of the extension portion 186 may be disposed to overlap the first antenna module 100. In this case, the distal end of the extension portion 186 may be disposed between the first antenna module 100 and the cover 30.

In an embodiment, the distal end of the extension portion 186 may be disposed to overlap the first magnetic portion 80a of the first antenna module 100. However, the antenna module is not limited thereto, but may be variously modified. For example, a portion of the first magnetic portion 80a of the first antenna module 100 may be removed, and the distal end of the extension portion 186 may be disposed in a region in which a portion of the first magnetic portion 80a is removed.

Figure 18:
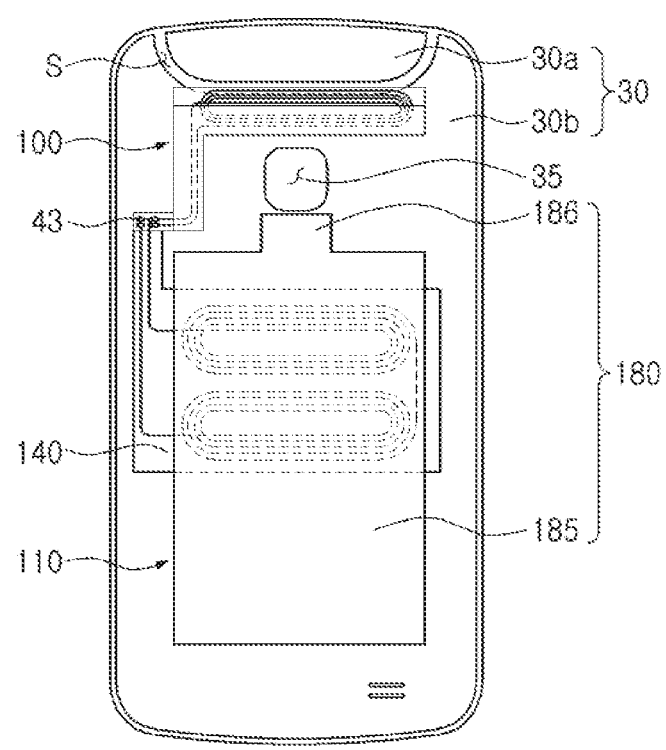

In the second antenna module 110 illustrated in FIG. 18, the distal end of the extension portion 186 may be disposed adjacent to the camera hole 35. In this case, a magnetic field generated from the second antenna module 110 may be formed along the extension portion 186 and be externally radiated through the camera hole 35.

Figure 19:
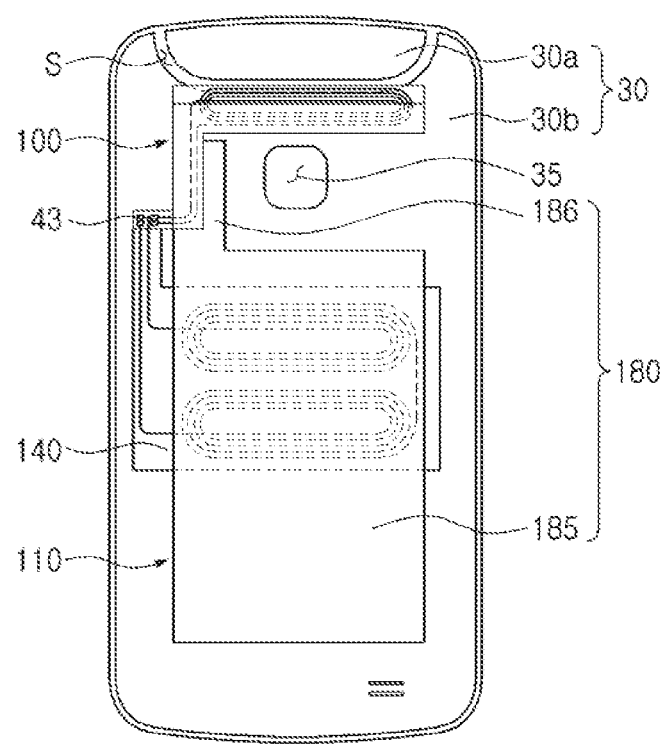

In the second antenna module 110 illustrated in FIG. 19, the extension portion 186 may be disposed to overlap the lead portion 40b (see FIG. 4) of the first antenna module 100. In more detail, the extension portion 186 may be disposed between the lead portion 40b of the first antenna module 100 and the cover 30.

In this case, the first magnetic portion 80a of the first antenna module 100 and the extension portion 186 of the second antenna module 110 may be disposed to overlap each other. However, the antenna module is not limited thereto, but may be variously modified. For example, a portion of the first magnetic portion 80a of the first antenna module 100 coupled to the lead portion 40b may be removed, and the extension portion 186 may be disposed in a region in which a portion of the first magnetic portion 80a is removed.

Figure 20:
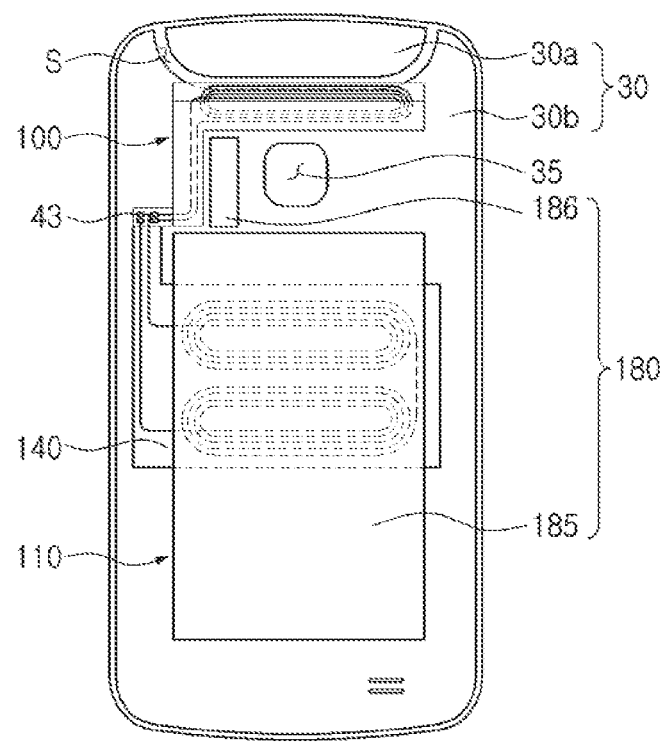

In the antenna module illustrated in FIG. 20, the extension portion 186 is not formed integrally with the second antenna module 110, but may be disposed to be separated from the second antenna module 110. In more detail, the extension portion 186 may be disposed at a position adjacent to the first antenna module 100, and may be disposed in parallel with the lead portion 40b of the first antenna module 100. Therefore, one end of the extension portion 186 may be disposed adjacent to the body portion 185 of the second antenna module 110, and the other end thereof may be disposed toward the space S. Alternatively, the extension portion 186 may be in contact with the lead portion 40b or be disposed adjacent to the lead portion 40b.

The extension portion 186 may be used for an operation of the second antenna module 110 as in the abovementioned embodiments. However, the extension portion 186 is disposed adjacent to the first antenna module 100, and the extension portion may thus be formed integrally with the first antenna module 100 in a process of manufacturing the first antenna module 100. In this case, the first antenna module 100 and the extension portion 186 may be fixed integrally with each other by an insulating tape, an insulating film (not illustrated), or the like.

However, since the extension portion 186 is used for the operation of the second antenna module 110, the extension portion 186 may be formed of the same material as that of the magnetic portion 180 of the second antenna module 110 or a material having a magnetic permeability similar to that of the magnetic portion 180 of the second antenna module 110.

Meanwhile, the extension portion 186 may also be formed integrally with the second antenna module 110, in an embodiment, as necessary. In this case, the second antenna module 110, the body portion 185, and the extension portion 186 may be fixed integrally with one another by an insulating tape, an insulating film (not illustrated), or the like. Alternatively, the extension portion 186 may be formed and disposed as a separate member that is not coupled to the first antenna module 100 or the second antenna module 110.

As set forth above, the antenna module according to embodiments may be disposed in a significantly small space and provide high performance, and may thus be advantageous in miniaturization and thinness of the electronic device in which the antenna module is mounted.

In addition, the first antenna module may form a magnetic field in a form similar to a solenoid by the first and second magnetic portions, and thus extend a size of the magnetic field generated from the first antenna wiring. Therefore, as compared to a case in which the first antenna wiring is formed in a planar coil form as in the second antenna wiring, a size of the antenna module may be decreased, and the same communications efficiency may be maintained.

A case in which the magnetic portion includes both of the first magnetic portion and the second magnetic portion is described by way of example in the abovementioned embodiments, but the magnetic portion may include only the first magnetic portion without including the second magnetic portion.

In addition, components disclosed in the abovementioned embodiments may be combined with one another.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna module comprising:
   a wiring portion comprising antenna wirings on an insulating substrate and comprising a first surface facing an inner surface of a conductive cover and a second surface opposing the first surface;
   a first magnetic portion disposed between the first surface of the wiring portion and the conductive cover; and
   a second magnetic portion disposed on the second surface of the wiring portion,
   wherein the first magnetic portion and the second magnetic portion are disposed to partially overlap each other or to have edges thereof in vertical correspondence with each other,
   wherein the conductive cover includes a space having a slit shape and a camera hole, and
   wherein at least a portion of the wiring portion is disposed between the space and the camera hole.

2. The antenna module of claim 1, wherein the wiring portion includes a spiral portion comprising a general contour in a linear shape comprising a length longer than a width and comprising a wiring comprising a spiral shape and a lead portion extending from one end of the spiral portion and including a contact pad.

3. The antenna module of claim 2, wherein the first magnetic portion is disposed to face a portion of the wiring comprising the spiral shape.

4. The antenna module of claim 1, wherein the first magnetic portion and the second magnetic portion penetrate through the wiring portion and are connected to each other.

5. The antenna module of claim 1, wherein the antenna wirings are disposed on both surfaces of the insulating substrate, and
   the first magnetic portion and the second magnetic portion are disposed in regions in which the antenna wirings are not disposed.

6. An electronic device comprising:
   a conductive cover including a space having a slit shape;
   a first antenna module disposed inside the conductive cover and performing near field communications; and a second antenna module disposed spaced apart from the first antenna module, wherein the first antenna module includes:

a wiring portion having antenna wirings on an insulating substrate and comprising a first surface facing an inner surface of the conductive cover and a second surface opposing the first surface;

a first magnetic portion disposed between the first surface of the wiring portion and the conductive cover; and a second magnetic portion disposed on the second surface of the wiring portion, wherein the first magnetic portion and the second magnetic portion being disposed to partially overlap each other or to have edges thereof in vertical correspondence with each other, wherein the second antenna module comprises a wiring portion and a third magnetic portion disposed stacked, and wherein the third magnetic portion includes, a body portion disposed to face the wiring portion of the second antenna module, and an extension portion having one end connected to the body portion or disposed adjacent to the body portion and the other end disposed toward the space.

7. The electronic device of claim 6, wherein the first magnetic portion is disposed so that at least a portion of the first magnetic portion faces the space.

8. The electronic device of claim 7, wherein an edge portion of the first magnetic portion is disposed along a boundary of the space.

9. The electronic device of claim 7, wherein the first magnetic portion is disposed to protrude toward the space to a greater extent than the wiring portion of the first antenna module.

10. The electronic device of claim 6, wherein any one of the first magnetic portion and the wiring portion of the first antenna module is disposed to protrude toward the space.

11. The electronic device of claim 6, wherein the conductive cover includes a camera hole, and at least a portion of the wiring portion of the first antenna module is disposed between the space and the camera hole.

12. The electronic device of claim 6, wherein the extension portion is disposed so that a distal end portion of the extension portion overlaps the first antenna module or the space.

13. The electronic device of claim 6, wherein the conductive cover includes a camera hole and the extension portion is disposed so that the other end of the extension portion is adjacent to the camera hole.

14. The electronic device of claim 6, wherein the conductive cover includes a camera hole, the wiring portion of the first antenna module comprises a spiral portion disposed between the space and the camera hole and a lead portion extending from one end of the spiral portion toward the second antenna module, and the extension portion of the second antenna module is disposed substantially parallel with the lead portion at a position adjacent to the lead portion.

15. The electronic device of claim 6, wherein the first antenna module forms a magnetic field in a form of a solenoid.

16. The electronic device of claim 6, wherein the second antenna module is a magnetic secure transmission (MST) antenna or a coil for wireless power charging.

17. The electronic device of claim 6, wherein the electronic device is a smartphone.

* * * * *